May 14, 1929.  N. BROWN  1,712,688
HARROW
Filed May 8, 1928  2 Sheets-Sheet 1
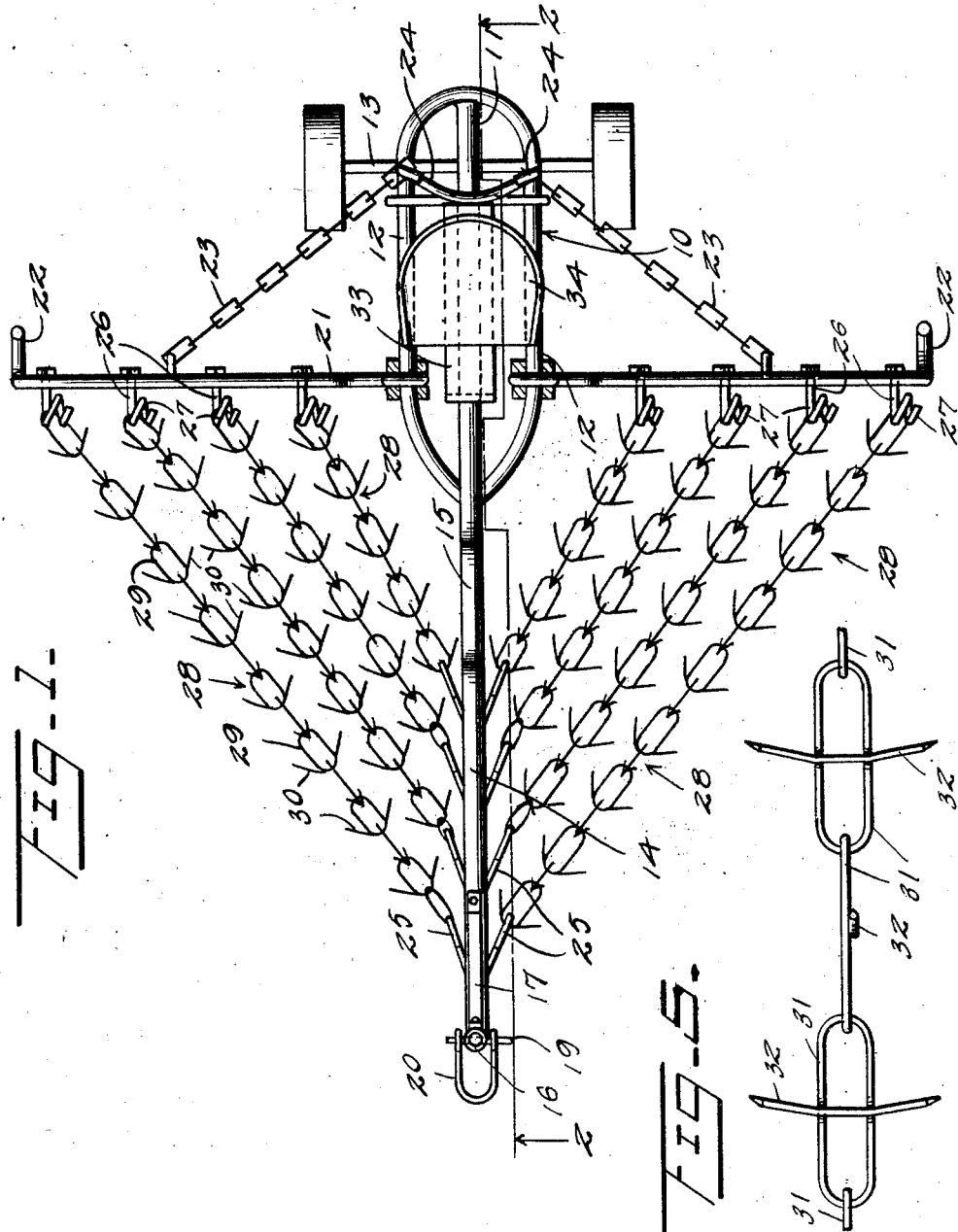
Inventor
N. Brown
By Watson E. Coleman
Attorney May 14, 1929.   N. BROWN   1,712,688
HARROW
Filed May 8, 1928   2 Sheets-Sheet 2
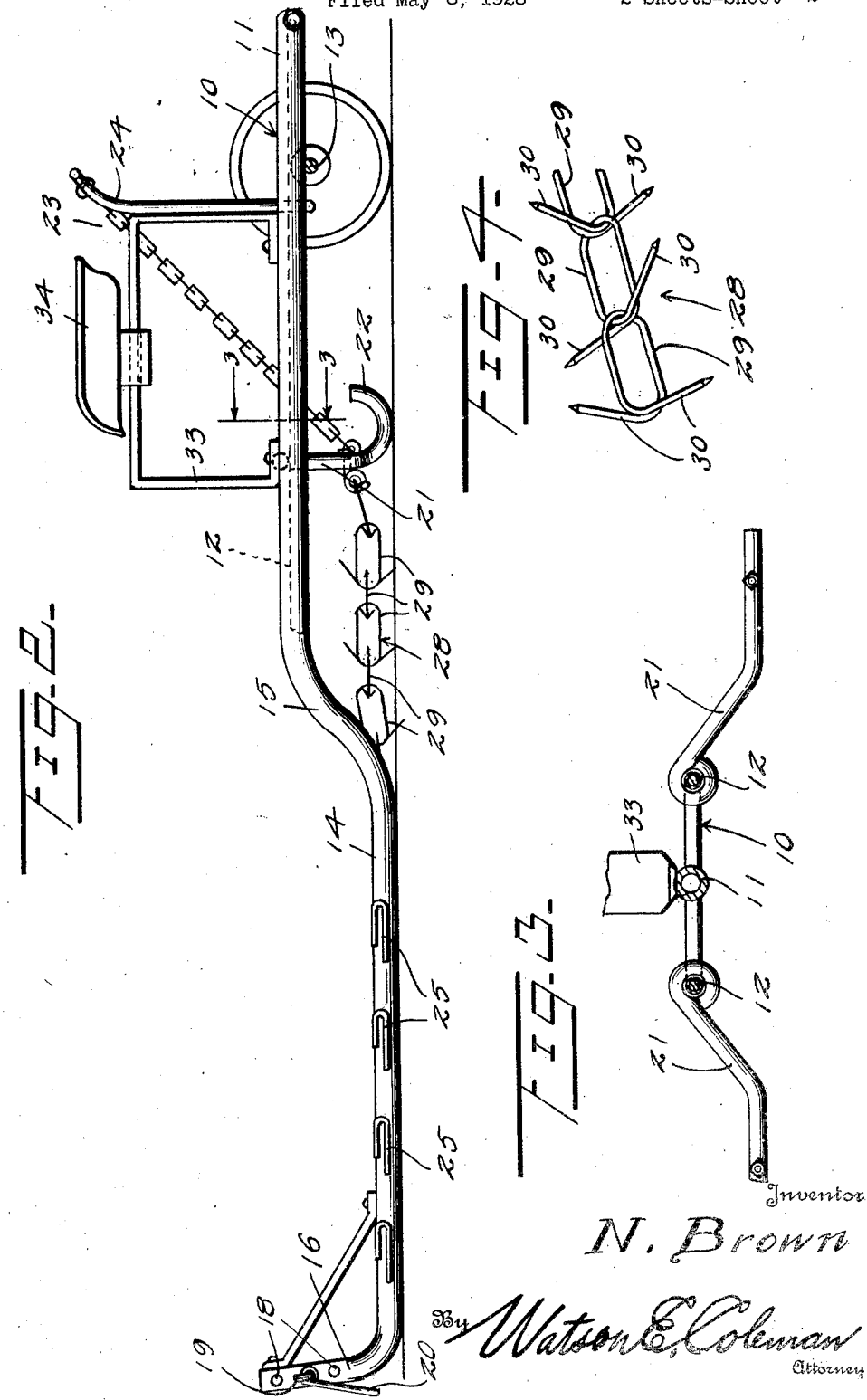
Inventor
N. Brown
By Watson E. Coleman
Attorney Patented May 14, 1929.

1,712,688

UNITED STATES PATENT OFFICE.

NATHANIEL BROWN, OF SEDAN, KANSAS.

HARROW.

Application filed May 8, 1928. Serial No. 276,108.

This invention relates to harrows and more particularly to a harrow employing chain-like elements as ground working implements.

An important object of the invention is to provide in a device of this character a structure such that the ground working implements may be caused to engage the ground with a desired pressure and may be shifted from their ground engaging position to an elevated position where they are out of engagement with the ground and where they will permit the harrow to be moved through a gate or other structure where its passage would normally be impossible.

A further object of the invention is to produce a device of this character in which the replacement of the ground working implements may be very readily accomplished.

A still further object of the invention is the production of a novel and improved ground working implement for use with devices of this character.

These and other objects I attain by the construction shown in the accompanying drawings, wherein for the purpose of illustration is shown a preferred embodiment of my invention and wherein:—

Figure 1 is a plan view of a cultivator constructed in accordance with my invention;

Figure 2 is a section on the line 2—2 of Figure 1;

Figure 3 is a section on the line 3—3 of Figure 2;

Figure 4 is a perspective view of a cultivator element;

Figure 5 is a plan view of a slightly modified form of cultivator element.

Referring now more particularly to the drawings, the numeral 10 generally designates a frame including a central member 11 and side members 12, the side members being connected to the central member at their front and rear ends. This frame is supported at its rear end by a wheel bearing axle 13 of any suitable character. The central member 11 is projected forwardly and forms a beam or tongue 14 which, in advance of the frame, is deflected downwardly, as indicated at 15. The forward end of this tongue has an upturned standard 16 which is braced to the tongue, as at 17, and provided with vertically spaced apertures 18 for the reception of the securing element 19 of a clevis 20.

Pivotally connected at their inner ends to the side members in such manner that they may partake of oscillation in addition to their rotation are arms 21, the outer ends of which are downbent to form skids 22 riding upon the surface of the ground. Each arm has connected thereto adjacent its outer end a flexible element 23 at present shown as a chain, and the frame 10 is provided with hooks 24 for engagement with these flexible elements. By varying the point of engagement of the flexible element with the hook, the pressure with which the arm will bear against the ground may be varied and as will hereinafter appear, the engagement of the ground working elements may be regulated.

By sufficiently shortening the effective length of the flexible elements, the arms may be held in a raised position.

The beam 14 is provided along its sides with series of longitudinally spaced hooks 25 while each arm has at its forward face a series of transversely spaced supports 26, the outer ends of which are formed with spiral coils 27, the turns of which are spaced from one another. The coils in each instance have their axes substantially perpendicular to their supports and are arranged at the outer sides of the supports from the beam. Connecting the hooks 25 and supports 26 which are correspondingly placed in the series at the same side of the beam are concatenate members, the elements of which each embody a plurality of ground working spurs 28. In Figure 4, these elements are shown as constructed by bending the central portion of a length of metal to produce a link 29 and projecting the ends of the metal beyond the sides of the link, as indicated at 30. In the form of the invention shown in Figure 5, links 31 are produced to which transversely extending bars 32 are secured as by welding. It will be noted that by this arrangement, the concatenate elements diverge rearwardly from the beam and are arranged in substantially parallel relation.

In the use of the device, the flexible element 23 is adjusted just sufficiently tightly to keep the concatenate elements from swinging against one another without lifting the arms 21 from the ground. The spurs 28 and links will act upon the surface of the ground to thoroughly pulverize the same and form a smooth even seed bed, and provide a dust mulch which acts very conveniently to retain moisture. To assist in maintaining the forward end of the beam in its proper position and to regulate the pressure with which this forward end is forced toward the ground, a seat support 33 is provided upon the frame upon which the seat 34 is adjustable longitudinally.

This support is arranged in advance of the axle 13, so that this longitudinal adjustment will cause considerable variation in the pressure brought to bear upon the forward end of the beam to force the same into engagement with the ground. It will be noted that the arms 21 are bent adjacent their inner ends so that these arms are horizontally disposed and in close proximity to the ground and the concatenate elements throughout their entire length will have working engagement with the ground.

Since the construction hereinbefore set forth is capable of a certain range of change and modification without materially departing from the spirit of the invention, I do not limit myself to such specific structure except as hereinafter claimed.

I claim:

1. In a cultivator, a frame including a forwardly extending beam, a pair of arms pivoted to the frame at their inner ends and having ground engaging supports at their outer ends, connectors carried by the forward end of said beam at each side thereof, connectors carried by the forward face of each arm, and substantially parallel concatenate members each having its forward end engaged with one of the connectors of the beam and its rear end connected with one of the connectors of the arm, the elements of said concatenate members each bearing earth working spikes.

2. In a cultivator, a frame including a forwardly extending beam, a pair of arms pivoted to the frame at their inner ends and having ground engaging supports at their outer ends, connectors carried by the forward end of said beam at each side thereof, connectors carried by the forward face of each arm, substantially parallel concatenate members each having its forward end engaged with one of the connectors of the beam and its rear end connected with one of the connectors of the arm, the elements of said concatenate members each bearing earth working spikes, the pivotal connection of said arms permitting oscillation of the arms in planes including the pivotal axes thereof, and means connecting the frame, rearwardly of the pivotal connections of the arm, and the outer ends of said arms for adjusting the outer ends of said arms rearwardly.

3. In a cultivator, a frame including a forwardly extending beam, a pair of arms pivoted to the frame at their inner ends and having ground engaging supports at their outer ends, connectors carried by the forward end of said beam at each side thereof, connectors carried by the forward face of each arm, substantially parallel concatenate members each having its forward end engaged with one of the connectors of the beam and its rear end connected with one of the connectors of the arm, the elements of said concatenate members each bearing earth working spikes, the pivotal connection of said arms permitting oscillation of the arms in planes including the pivotal axes thereof, and means connecting the frame, rearwardly of the pivotal connections of the arm, and the outer ends of said arms for adjusting the outer ends of said arms rearwardly, or maintaining said arms in a substantially vertical position.

4. In a cultivator, a frame including a forwardly extending beam, a pair of arms pivoted to the frame at their inner ends and having ground engaging supports at their outer ends, connectors carried by the forward end of said beam at each side thereof, connectors carried by the forward face of each arm, substantially parallel concatenate members each having its forward end engaged with one of the connectors of the beam and its rear end connected with one of the connectors of the arm, the elements of said concatenate members each bearing earth working spikes, supporting wheels for the rear end of the frame, a seat mounting carried by said frame forwardly of the supporting wheels, and a seat adjustable upon said mounting longiutdinally of the frame.

5. In a cultivator, a frame including a forwardly extending beam, a pair of arms pivoted to the frame at their inner ends and having ground engaging supports at their outer ends, connectors carried by the forward end of said beam at each side thereof, connectors carried by the forward face of each arm, substantially parallel concatenate members each having its forward end engaged with one of the connectors of the beam and its rear end connected with one of the connectors of the arm, the elements of said concatenate members each bearing earth working spikes, and means connecting the frame and said arms for adjusting the tension of said concatenate members.

6. In a cultivator, a frame including a forwardly extending beam, a pair of arms pivoted to the frame at their inner ends and having ground engaging supports at their outer ends and substantially parallel concatenate members arranged at each side of the beam and having their forward ends connected to the beam and their rear ends connected to the arm at the corresponding side of the beam.

7. In a cultivator, a frame including a forwardly extending beam, a pair of arms pivoted to the frame at their inner ends and having ground engaging supports at their outer ends and substantially parallel concatenate members arranged at each side of the beam and having their forward ends connected to the beam and their rear ends connected to the arm at the corresponding side of the beam, the elements of said concatenate members each bearing earth working spikes.

In testimony whereof I hereunto affix my signature.

NATHANIEL BROWN.